(12) United States Patent
Owen

(10) Patent No.: US 7,366,943 B1
(45) Date of Patent: Apr. 29, 2008

(54) LOW-LATENCY SYNCHRONOUS-MODE SYNC BUFFER CIRCUITRY HAVING PROGRAMMABLE MARGIN

(75) Inventor: Jonathan Mercer Owen, Northboro, MA (US)

(73) Assignee: Advanced Micro Devices, Inc., Sunnyvale, CA (US)

( * ) Notice: Subject to any disclaimer, the term of this patent is extended or adjusted under 35 U.S.C. 154(b) by 580 days.

(21) Appl. No.: 11/036,359

(22) Filed: Jan. 18, 2005

(51) Int. Cl.
*G06F 1/00* (2006.01)
*G06F 1/12* (2006.01)
*G06F 3/00* (2006.01)
*G06F 5/00* (2006.01)

(52) U.S. Cl. ............. 713/500; 713/501; 713/600; 710/58; 710/61

(58) Field of Classification Search ........... 713/500, 713/501, 600; 710/58, 61
See application file for complete search history.

(56) References Cited

U.S. PATENT DOCUMENTS 5,623,644 A * 4/1997 Self et al. .............. 713/503
5,692,137 A * 11/1997 Regal et al. ............ 710/310
6,675,251 B1 * 1/2004 Streitenberger et al. ... 710/306
7,263,149 B2 * 8/2007 Ware et al. .............. 375/354
2002/0083233 A1 6/2002 Owen et al.

OTHER PUBLICATIONS

"AMD-3181™ HyperTransport™ PCI-X® Tunnel Data Sheet", 24637 Rev. 3.02, Aug. 10, 2004, pp. 1-87.

* cited by examiner

*Primary Examiner*—Mark Connolly
(74) *Attorney, Agent, or Firm*—Manelli Denison & Selter PLLC; Leon R. Turkevich

(57) ABSTRACT

Synchronization is attained between a source clock domain and a target clock domain of arbitrary frequency ratios and each of which periodically has edges nominally aligned to edges of a reference clock signal, marked by the assertion of a periodic sync signal. The periodic sync signal, synchronous with the source clock, is used to output to an unload pointer counter in the target clock domain the deassertion of a reset signal prior to the nominal alignment of the source clock and the target clock for sampling on the nominally aligned target clock edge. The deassertion of the reset signal is output to a load pointer in the source clock domain coincident with the nominally-aligned edges of the source clock and the target clock. Both loading and unloading start based on the reset deassertion being sampled on the nominally aligned edges in the appropriate clock domain.

10 Claims, 4 Drawing Sheets

| N:M | Numerator (M) | Denominator (N) | Load Ptr. Start Val. | Init. Num. Ptr. Val. |
|---|---|---|---|---|
| 3:2 | 110 | 3 | 1 | 0 |
| 4:3 | 1110 | 4 | 1 | 0 |
| 5:4 | 11110 | 5 | 1 | 0 |
| 6:5 | 111110 | 6 | 1 | 0 |
| 7:5 | 1110110 | 7 | 1 | 0 |
| ⋮ | ⋮ | ⋮ | ⋮ | ⋮ |
| 8:3 | 10100100 | 8 | 2 | 1 |
| ⋮ | ⋮ | ⋮ | ⋮ | ⋮ |
| 24:23 | ... | 24 | 3 | 0 |
| TO=2ns | Set Bit i, i=INT [X * N/M], X=1 to M-1 | | | |

LOW-LATENCY SYNCHRONOUS-MODE SYNC BUFFER CIRCUITRY HAVING PROGRAMMABLE MARGIN

BACKGROUND OF THE INVENTION

1. Field of the Invention

The present invention relates to synchronization of data, and more particularly, to a low latency method of synchronizing high-speed data between two clock domains having respective clocks generated from the same timebase and having a prescribed frequency relationship.

2. Background Art

Newer communications systems require advanced processing of high speed digital signals in order to accommodate precise timing requirements. For example, processor-based communications systems utilize high speed bus architectures, such as HyperTransport™ bus architectures, to transfer large groups of data at high data rates. For example, the HyperTransport™ Specification specifies data transfer between discrete components (e.g., between a microprocessor and a PCI bridge) in data groups (packets) of up to 64 bytes, at prescribed data rates of 400 Megabits per second (Mbs) up to 2.0 Gigabits per second (Gbs) per wire.

In some high speed bus architectures, such as HyperTransport™, it is required that the frequency of the transmit bus (i.e., the transmit clock domain) be programmable and changeable within a running system. However, it is also often the case that it is not desired to change the clock frequency at which the remainder of the local chip runs (i.e., the local clock domain), perhaps because it connects to another bus of a specific defined frequency, or has been tuned to run most efficiently at a particular frequency. The local clock domain may also run at a much slower frequency than the transmit clock domain. Accordingly, there is a need to synchronize data from the local clock domain to the transmit clock domain.

In many applications both the local and transmit clocks are generated from a single timebase, given by a single clock input, and passed through 2 different phase locked loop (PLL) circuits to generate the two different target frequencies. Averaged over a long period of time, these target frequencies will be in a simple ratio, given by the ratio of the dividers in the PLL circuits. However, the PLL circuits will induce jitter (both correlated and uncorrelated between the PLLs) across the target clocks, causing the clocks to move relative to their ideal alignment to the reference and each other.

Techniques for synchronizing data between the local and transmit clock domains generated from a common timebase have included gearboxes and sync FIFOs with synchronized valid bits. Gearboxes only work, however, if the clock frequencies are small multiples of each other, such that the minimum time for data to from any local clock edge to any transmit clock edge provides enough time for the data to propagate from a flip-flop clocked by the local clock to a flip-flop clocked by the transmit clock and make setup there, in the presence of jitter. Hence, gearboxes cannot be used for arbitrary frequency ratios between the local clock and transmit clock. Synchronizing valid bits works across any ratio of frequencies, but introduces the latency required to do the synchronization.

SUMMARY OF THE INVENTION

There is a need for an arrangement in a communications system that provides a precise synchronization of data from a source clock domain to a target clock domain with minimal increase in latency.

There also is a need for an arrangement that provides synchronization of data from a source clock domain to a target clock domain in a manner that enables an arbitrary integer ratio of frequencies to exist between the source clock and the target clock.

These and other needs are attained by the present invention, where synchronization is attained between a local (source) clock domain and a transmit (target) clock domain of arbitrary frequency ratios and each of which periodically has edges nominally aligned to edges of a reference clock signal, with these nominally aligned edges marked by the assertion of a periodic sync signal. The periodic sync signal is synchronous with the source clock and is used to output, to an unload pointer counter in the target clock domain, the deassertion of a reset signal one-half a local clock cycle prior to the nominal alignment of the source clock and the target clock such that it may safely be sampled on the nominally aligned target clock edge. The deassertion of the reset signal is output to a load pointer in the source clock domain coincident with the nominally-aligned edges of the source clock and the target clock. Data is loaded into a buffer circuit, according to a selected initial value in the load pointer counter, at selected instances relative to the frequency ratios and determined delay intervals. Both loading and unloading start based on the reset deassertion being sampled on the nominally aligned edges in the appropriate clock domain. Therefore, the load logic in the source domain can, given the frequency ratio, predict the points at which data will be unloaded, to within some uncertainty. Hence, the unload pointer can output data from the buffer circuit while the load pointer counter loads data into the buffer circuit, with minimal latency and with programmable margins to accommodate timing variations.

One aspect of the invention provides a synchronous transmission system. The system includes a source clock source configured for generating a source clock signal at a corresponding first multiple of a reference clock signal. The source clock signal has a first nominally-aligned edge relative to an edge of the reference clock signal. The system also includes a target clock source configured for generating a target clock signal at a corresponding second multiple of the reference clock signal. The target clock signal has a second nominally-aligned edge relative to the edge of the reference clock signal, the first and second multiples being unequal and providing a clock ratio between the source and target clock signals. The system also includes first circuitry configured for outputting data according to a first bandwidth in response to a data accept signal synchronous with the source clock signal, the first circuitry including a sync counter configured for generating a periodic sync signal indicating the first and second nominally-aligned edges are aligned relative to each other. The system also includes a data buffer configured for storing the output data, synchronous with the source clock signal, at a first location specified by a load pointer and outputting stored data from a second location specified by an unload pointer.

The system also includes an unload pointer counter configured for outputting the unload pointer synchronous with the target clock signal for output of the stored data according to a second bandwidth lower than the first bandwidth. The unload pointer counter is enabled in response to deassertion of a first reset signal and configured for incrementing the unload pointer in response to a prescribed edge of the target clock signal that has a same polarity as the first and second nominally-aligned edges. The system also includes a load circuit configured for outputting the data accept signal at selected instances corresponding to the second multiple relative to the first multiple of the source clock cycles. The load circuit includes a load pointer counter configured for outputting the load pointer from a selected initial value and synchronous with the source clock signal, the load pointer counter enabled in response to deassertion of a second reset signal and configured for selectively incrementing the load pointer in response to the corresponding prescribed edge of the source clock signal.

The system also includes a reset sychronizer circuit including a first flip-flop and a second flip-flop. The first flip-flop is configured for outputting the deassertion of the first reset signal, coincident with an inverse-polarity edge of the source clock signal immediately preceding the first and second nominally-aligned edges, in response to a global reset signal deasserted concurrent with assertion of the periodic sync signal during the inverse-polarity edge of the source clock signal that immediately precedes the first nominally-aligned edge. A time interval between the inverse-polarity edge and the first nominally-aligned edge corresponds to one half of a clock cycle of the source clock signal and provides an adequate setup time between the unload pointer counter detecting the deassertion of the first reset signal and a stable state for the unload pointer counter. The second flip-flop is configured for outputting the deassertion of the second reset signal, coincident with the first and second nominally-aligned edges, in response to the global reset signal deasserted concurrent with assertion of the periodic sync signal during the first nominally-aligned edge of the source clock signal.

Additional advantages and novel features of the invention will be set forth in part in the description which follows and in part will become apparent to those skilled in the art upon examination of the following or may be learned by practice of the invention. The advantages of the present invention may be realized and attained by means of instrumentalities and combinations particularly pointed in the appended claims.

BRIEF DESCRIPTION OF THE DRAWINGS

Reference is made to the attached drawings, wherein elements having the same reference numeral designations represent like element elements throughout and wherein.

BEST MODE FOR CARRYING OUT THE INVENTION

The disclosed embodiment is directed to an integrated circuit, for example a microprocessor or a device that interfaces with the microprocessor via a high-speed link such as a HyperTransport™ link, having a transmit buffer circuit configured for outputting synchronous data signals based on synchronization between a local clock generated according to a local clock domain, and a transmit clock identifying a transmit clock domain, the local clock and the transmit clock generated based on the same reference frequency. As described below, however, the local clock and the transmit clock can have a relationship of an integer ratio of frequencies, with some jitter.

Figure 1:
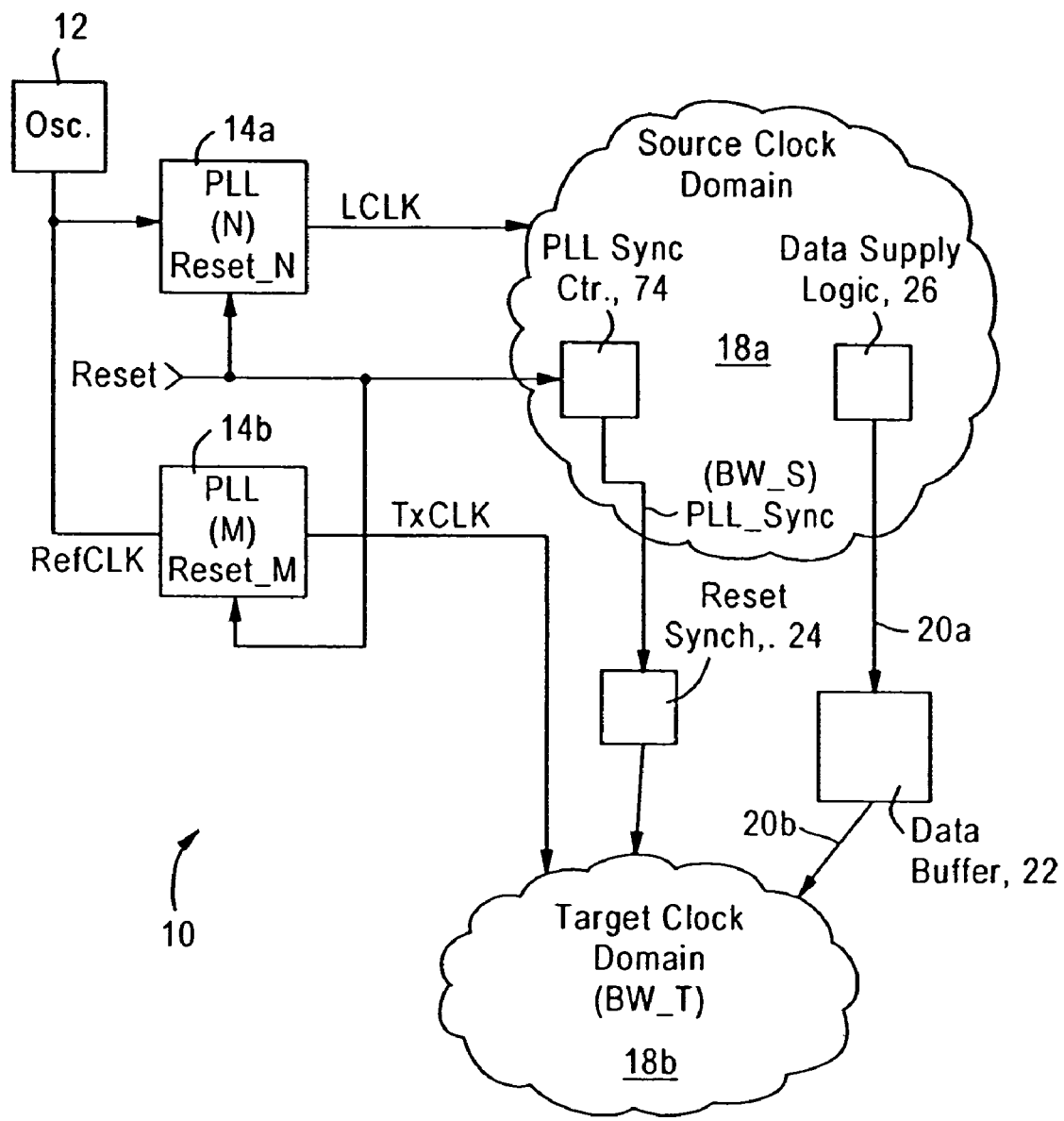
FIG. 1 is a block diagram illustrating the synchronous transmission system according to an embodiment of the present invention.

FIG. 1 is a diagram illustrating a synchronous transmission system 10 including an oscillator 12 configured for generating a reference clock signal (RefCLK), phase locked loops (PLLs) 14a, 14b configured for generating a local clock (LCLK) (i.e., a source clock) and a transmit clock (TxCLK) (i.e., a target clock) at respective frequencies that are at prescribed multiples N and M of the reference clock signal (RefCLK), respectively, and circuitry operating in a source clock domain 18a based on the local clock (LCLK) and a target clock domain 18b based on the transmit clock (TxCLK).

As recognized in the art, each PLL 14a and 14b is implemented as a feedback loop that includes a PLL divide counter configured for dividing the corresponding PLL output signal (e.g., LCLK for PLL 14a and TxCLK for PLL 14b) by a prescribed amount (e.g., N for PLL 14a, M for PLL 14b), and outputting a divided signal. Each PLL 14a and 14b also includes a phase comparator and a voltage controlled oscillator (VCO): the phase comparator outputs a phase difference signal representing the phase difference between the divided signal and the reference clock (RefCLK), and the VCO outputs the corresponding PLL output signal to the corresponding clock domain. The PLLs 14a and 14b are initially reset by a global reset signal (Reset) that is synchronous with the RefCLK signal. The global reset signal (Reset) also is supplied to a PLL Sync Counter 74 in the source clock domain 18a, described below. Although not illustrated in FIG. 1, the global reset signal (Reset) is synchronized in the LCLK domain prior to being supplied to the PLL Sync Counter 74; since the number of LCLK cycles required for the global reset signal (Reset) to pass through the synchronizer in the source clock domain 18a is known, the PLL Sync Counter 74 can begin counting at the appropriate value based relative to the known number of LCLK cycles required for the global reset signal.

Although the disclosed embodiment is described with reference to a synchronous transmission system, the embodiment is not necessarily limited to a transmit or receive system; rather, the disclosed embodiment is best considered as a device configured for passing data from data supply logic 26 in one clock domain (i.e., "source clock domain") 18a to a target clock domain (i.e., "target clock domain") 18b.

A particular feature that is relied on in this embodiment is that the data bandwidth of the source clock domain 18a (BW_S) is greater than the data bandwidth of the target clock domain 18b (BW_T), where bandwidth is defined as the width of the data path (e.g., 64 bits) multiplied by the associated clock frequency; hence, if both the source clock domain 18a and the target clock domain 18b use the same-width data paths, the clock of the source clock domain 18a (LCLK) will have a higher frequency than the clock of the target clock domain 18b (TxCLK).

Consequently, a necessary feature of the system 10 is determining when to supply data from the data supply logic 26, operating in the source clock domain 18a, to the target clock domain 18b via a data bus 20 in a manner that results in the presence of valid data within the transmit data domain 18b without introducing unnecessary latency. In particular, the synchronous data transmission system 10 includes a data buffer 22 (e.g., a transmit FIFO) configured for storing data prior to transmission, and a reset synchronizer 24 configured for interfacing between the source target domain 18a and the target clock domain 18b. The target clock domain 18b is configured for outputting data from the data buffer 22 each clock cycle of the target clock domain 18b; as recognized in the art, idle data output by the data supply logic 26 may be stored in the buffer 22 if the data supply logic 26 in the source clock domain 18a does not have any data to transmit. The data supply logic 26 in the source clock domain 18a, however, supplies data to the buffer 22 at a rate that matches the read rate of the target clock domain 18b so as to not overflow or underflow the buffer 22.

However, in order to minimize latency between the source clock domain 18a and the target clock domain 18b, it is actually preferable to not supply data from the data supply logic 26 to the buffer 22 until the latest possible instant. In other words, if a prescribed pattern of data was to be output and stored in the buffer 22 for a time interval, the latency would correspond to the time interval that the data was stored in the buffer 22; note, however, that if the data is time-invariant, then the issue of whether the data is supplied into the buffer 22 earlier (resulting in higher latency) or later (resulting in lower latency) is inconsequential. However, instances may arise that if transfer of data into the buffer 22 could be delayed, that different data (or better or higher-priority data) could be supplied. Hence, as described in further detail below, the disclosed embodiment is configured for ensuring that the data is supplied to the buffer 22 as late as possible to minimize the necessity of adding idle packets to the buffer 22.

Figure 2:
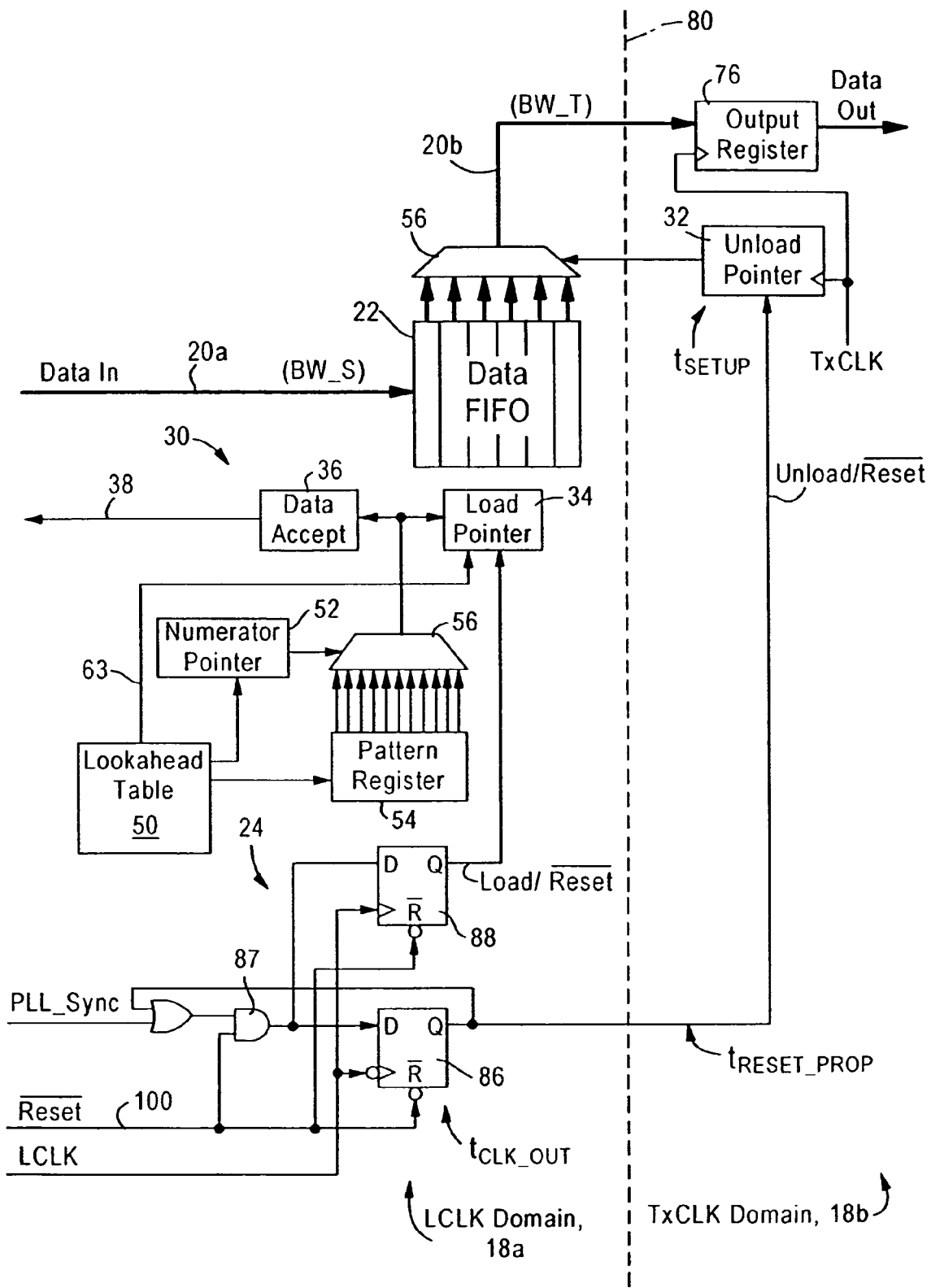
FIG. 2 is a diagram illustrating in further detail the buffer circuit, the reset sychronizer circuit, and the source and target clock domains of FIG. 1, according to an embodiment of the present invention.

FIG. 2 is a diagram illustrating in further detail the buffer 22 and the reset synchronizer 24 configured for transferring data between the source clock domain 18a and the target clock domain 18b, according to an embodiment of the present invention. The data buffer 22 is configured for receiving the data from the data supply logic 26 of FIG. 1 via a 64-bit data bus 20a. The transmission system 10 also includes a load circuit 30 configured for writing data into the buffer 22 according to the source clock domain 18a, and an unload pointer counter 32 configured for outputting the stored data from the data buffer 22 onto a 16-bit Quad-Data-Rate (QDR) transmit data bus 20b according to the target clock domain 18b. As described below, the load circuit 30 is configured for outputting data onto the transmit data bus 20b such that the data signal is stabilized on the data bus 20b (i.e., the data is not transitioning but at a stable state of either a logical "1" or "0") in time to make setup to the rising edge of the clock signal (TxCLK) of the target clock domain 18b representing valid data on the transmit data bus 20b.

The unload pointer counter 32, implemented as a circular counter, configured for pointing to a location in the data buffer 22 for reading the output data. According to the disclosed embodiment, the unload pointer counter 32 is a "free-running counter" in that the unload pointer counter 32 is incremented each rising edge of a clock cycle (TxCLK) of the target clock domain 18b.

The load circuit 30 includes a load pointer counter 34, implemented as a circular counter that increments on rising edges of a clock cycle (LCLK) of the source clock domain that are used to capture data from the input bus 20a as indicated by the assertion of data accept, configured for pointing to the next write location in the data buffer 22 for to be loaded with output data. As described below, the load circuit 30 is configured for supplying the data via the input data bus 20a with the minimum amount of time necessary for the data to stabilize within the data buffer 22 before the unload pointer counter 32 points to the stored data for output thereof onto the output data bus 20b. Hence, the data is stored in the data buffer 22 for the minimum time interval needed.

The load circuit 30 includes a data accept signal generator 36 configured for generating a data accept signal 38: the data accept signal 38 is asserted to signal to data supply logic 26 in the source clock domain 18a that the output data on the input data bus 20a has been latched into the data FIFO 22, and that it should output its next data value. As described below, the data accept signal generator 36 generates the data accept signal 38 as late as possible to minimize latency of the data in the buffer 22.

As described above, the two clocks LCLK and TxCLK are generated based on the same time base, namely the reference clock RefCLK. Hence, if the clocks RefCLK, LCLK and TxCLK are averaged over a long period of time, the clock frequencies will have an integer ratio-based relationship. The amount of data transferred per LCLK cycle over the Data In bus (20a) and the amount of data transferred per TxCLK cycle over the Data Out bus will also have an integer ratio-based relationship. Therefore, the LCLK bandwidth (BW_S) which is the product of the LCLK frequency and amount of data transferred per LCLK cycle, and the TxCLK bandwidth (BW_T) which is the product of the TxCLK frequency and amount of data transferred per TxCLK cycle, will also have an integer ratio-based relationship. For example the LCLK bandwidth (BW_S) is 4:3 times the TxCLK bandwidth (BW_T) (i.e., BW_S=4/3*BW_T), such that in the LCLK domain 18a, that data should be supplied to the buffer 22 three out of every four clock LCLK cycles to match the bandwidth of the TxCLK domain 18b. Note, however, that in the short term (34 clock cycles), the jitter on the PLLs 14a and 14b may cause the ratio between the LCLK bandwidth (BW_S) and the TxCLK bandwidth (BW_T) to vary slightly from the integer ratio.

In particular, PLLs are characterized in terms of short term jitter (i.e., deviation within a nominal cycle time) and long term jitter (i.e., accumulated deviation over time cannot exceed a prescribed amount relative to an ideal clock at the nominal frequency).

Figure 3:
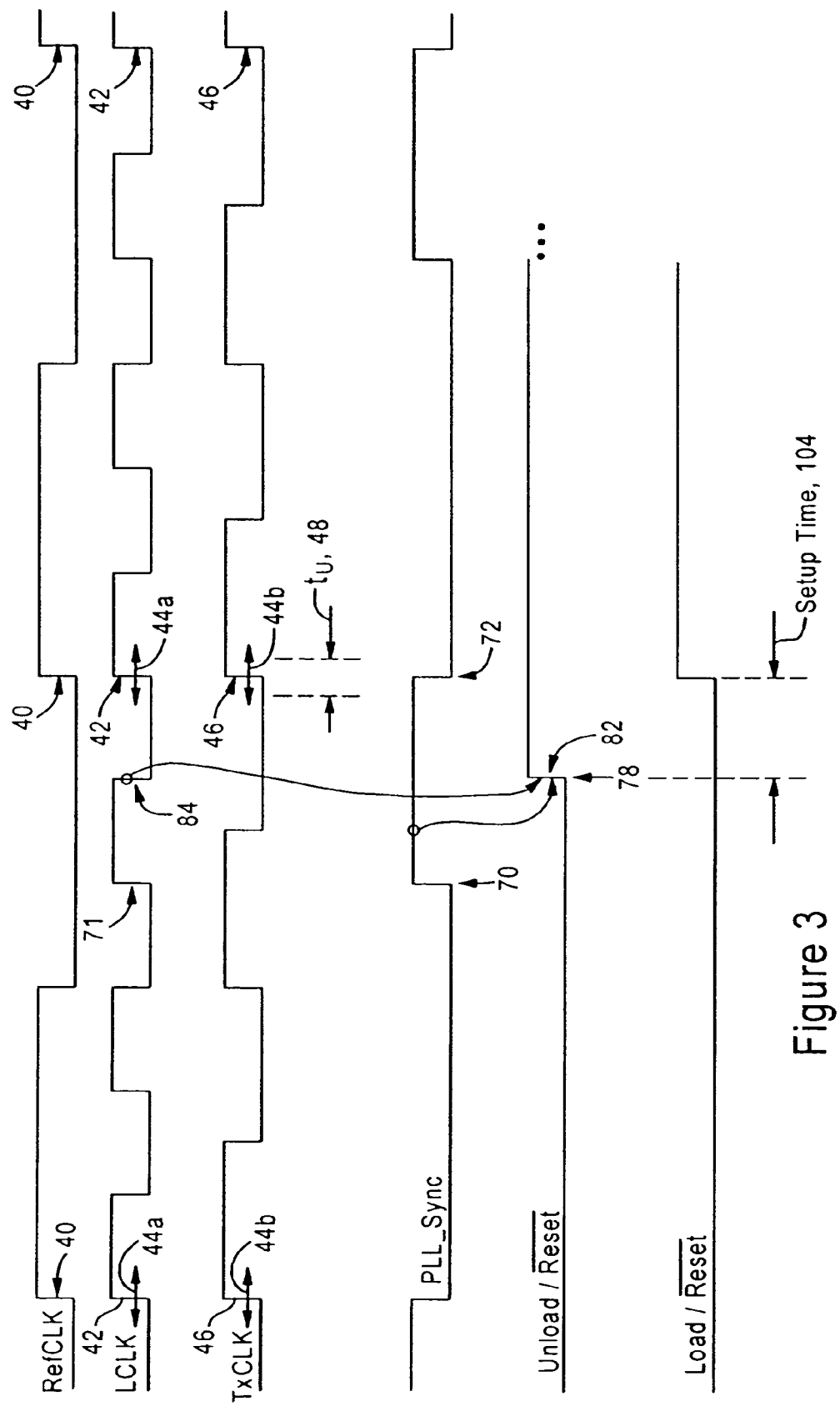
FIG. 3 is a timing diagram illustrating the operation of the synchronous transmission system of FIGS. 1 and 2.

FIG. 3 is a diagram illustrating exemplary timing relationships between the reference clock (RefCLK), the local clock (LCLK) generated by the PLL 14a, and the transmit clock (TxCLK) generated by the PLL 14b, and the sync signal (PLL_Sync). As illustrated in FIG. 3, the local clock (LCLK) is three times the frequency of the reference clock (RefCLK), and the transmit clock (TxCLK) is twice the frequency of the reference clock (RefCLK), such that the local clock (LCLK) and the transmit clock (TxCLK) have an integer ratio of 3:2. The PLL 14a aligns the local clock (LCLK) with the reference clock (RefCLK); hence, each rising edge 40 of the reference clock (RefCLK) causes the PLL 14a to generate a corresponding rising edge 42 in the local clock (LCLK). Similarly, the PLL 14b aligns the transmit clock (TxCLK) with the reference clock (RefCLK); hence, each rising edge 40 of the reference clock (RefCLK)

causes the PLL 14*b* to generate a corresponding rising edge 42 in the transmit clock (TxCLK).

The actual implementation of the PLLs 14*a* and 14*b* will cause the generated signals LCLK and TxCLK to include jitter 44*a* and 44*b* that deviates from the rising edge 40 of the reference clock (RefCLK). Edges are nominally aligned if they would have been perfectly aligned by an ideal clock generator and distribution path. In a real implementation, the nominal alignment has some error due to PLL jitter and imperfectly matched clock distribution. Since both clocks periodically have edges nominally aligned with the reference clock, they also have edges periodically nominally aligned with each other. Hence, the rising edge 42 of LCLK is nominally aligned with the rising edge 40 of the reference clock (RefCLK), i.e., aligned ideally except for the uncertainty ($t_U$) introduced by the corresponding jitter 44*a* generated by the PLL 14*a*; similarly, the rising edge 46 of TxCLK is nominally aligned with the rising edge 40 of the reference clock (RefCLK), i.e., aligned ideally except for the uncertainty ($t_U$) introduced by the corresponding jitter 44*b* generated by the PLL 14*b*.

As apparent from the foregoing, the integer-based frequency selection of the local clock LCLK relative to the reference clock RefCLK determines how many clock cycles (N) of the local clock LCLK occur before its rising edge 42 nominally aligns with the rising edge 40 of the reference clock RefCLK: as shown in FIG. 3, a 3:1 frequency ratio (N=3) between the local clock LCLK and the reference clock RefCLK results in the rising LCLK edge 42 nominally aligning with the rising RefCLK edge 40 every three clock cycles; a 5:1 frequency ratio would result in the edges 42 nominally aligning with the edge 40 every five clock cycles, etc. Similarly, a 2:1 frequency ratio (M=2) between the transmit clock TxCLK and the reference clock RefCLK results in the rising TxCLK edge 46 nominally aligning with the rising RefCLK edge 40 every two clock cycles.

Hence, all of the edges 40, 42, and 46 of the RefCLK, the LCLK, and the TxCLK are in nominal alignment at least every N local clock (LCLK) cycles in the source target domain 18*a*, or every M transmit clock cycles in the target clock domain 18*b*. In other words, the source clock LCLK and the target clock TxCLK have respective rising edges that are in periodic nominal alignment.

Hence, the edges 42 and 46 are determinable by counting the edges in any clock domain 18*a* or 18*b*, and recognizing that certain edges (e.g., 42) in one clock domain (e.g., 18*a*) will be nominally aligned with respective edges (e.g., 46) in another clock domain (e.g., 18*b*). As described previously, each of the PLLs 14*a* and 14*b* reset their respective internal divide counters in response to a global reset signal synchronous to RefClk. This same reset signal is used to reset the PLL Sync Counter in the LCLK domain that generates PLL_Sync. The deassertion of this reset signal may be passed through an LCLK domain synchronizer, resulting in some number of LCLK cycles of latency between reset deassertion at the PLLs and at the PLL Sync Counter. In that case, the PLL Sync Counter is configured to reset to a value equal to the number of cycles of latency, rather than 0. The PLL Sync Counter output thus counts the number of LCLK cycles since reset deassertion at the PLLs. The PLL_Sync signal is asserted when the PLL Sync Counter reaches the appropriate value, and the Counter wraps back to 0.

In evaluating the difference between the source clock (LCLK) and the target clock (TxCLK), implementation of the system 10 on a single silicon-based integrated circuit results in the jitter encountered by the PLLs 14*a* and 14*b* having a determinable correlation (e.g., the jitter 44*a* and 44*b* move together due to shared on-chip jitter sources), reducing the overall effects of the jitter 44*a* and 44*b*. Hence, in comparing the source clock (LCLK) and the target clock (TxCLK), some of the effects of the jitter 44*a* and 44*b* are canceled out.

Hence, circuitry within the source clock domain 18*a* is able to identify edges 42 of the source clock signal (LCLK) that will be nominally aligned with the edges 46 target clock signal (TxCLK), and at those nominally aligned edges 42 and 46 there will be a quantifiable uncertainty ($t_U$) 48 having a determinable limit, resulting in the edges 42 and 46 being aligned within the error of the uncertainty ($t_U$) 48 (i.e., $+/-t_U/2$).

Referring again to FIG. 2, the load circuit 30 further includes a lookahead table 50, a numerator pointer 52, a pattern register 54, and a multiplexer 56. According to the disclosed embodiment, the lookahead table 50 is configured for storing entries that specify precalculated integer-based frequency combinations, described below with respect to FIG. 4. The pattern register 54 is loaded with a bit pattern 62 representing a numerator value, described below, and the load pointer counter 34 is loaded with a start value 63. The pattern register 54 is coupled to a multiplexer 56 that cycles through each bit of the bit pattern 62 in response to a selection signal from the numerator pointer 52, in order to output a successive bit from the bit pattern sequence. In particular, the numerator pointer 52 starts from an initial value, and increments in sequence and synchronous with every rising edge of the LCLK signal. The numerator pointer 52 increments until it reaches the value given by denominator 64 minus 1, and then returns to 0. Thus, it will continue to select all bits in the pattern repeatedly.

Alternately, the pattern register 54 can be implemented for example as a circular shift register having a programmable length (eliminating the necessity of the multiplexer 56 and the numerator pointer 52), causing the pattern register 54 to selectively output a set bit ("1") based on the corresponding bit in the stored pattern being set. Hence, the pattern register 54 can be implemented as a shift register having a maximum length (i.e., the maximum possible denominator value 64), for example a series of twenty-four flip flops for storing respective 24 bits, and an internal multiplexer configured for selecting one of the flip-flop outputs as the feedback input to the shift register based on the denominator value 64. Hence, a selection input to the internal multiplexer of the pattern register 54 effectively controls the width of the shift register to match the width (N) of the bit pattern 62. When implemented this way, the initial numerator value must be used to shift the bit pattern before loading it into the pattern register.

The output of a set bit ("1") by the pattern register 54 and/or the multiplexer 56 causes the data accept register 36 to assert a data accept signal 38 to the data supply logic 26, causing the data supply logic 26 to load data into the buffer 22 via the data bus 20*a* according to the source clock domain (LCLK) 18*a* and the load pointer counter 34 to increment.

Figures 4, 5:
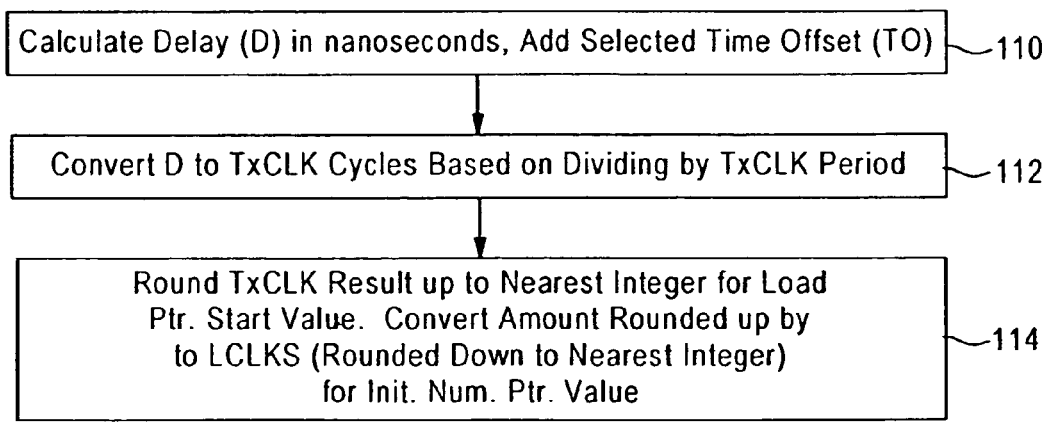
FIG. 4 is a diagram illustrating in detail the lookahead table of FIG. 2.
FIG. 5 is a diagram illustrating the method of determining the entries of the lookahead table of FIG. 2.

FIG. 4 is a diagram illustrating in detail the lookahead table 50 of FIG. 2. Each entry 60 of the lookahead table includes precalculated integer-based frequency combinations. In particular, each entry 60 represents a corresponding entry, indexed based on the relative frequencies of the source clock (N for LCLK) and the target clock (M for TxCLK), and that includes a precalculated numerator value 62, a precalculated denominator value 64, a load pointer start value 63, and an initial numerator pointer value 65. The denominator value 64 is expressed as a single integer; the numerator value 62 is expressed as a bit pattern, where the number of bits is equal to the denominator and the number of set bits ("1") in the pattern is equal to the numerator value. As described below, the bit distribution pattern of the numerator 62 is generated such that the first bit ("bit 0") always has a set value ("1"), indicating a load in the first LCLK cycle, and subsequent bit positions are selectively set based on implementing the expression 66 INT[X*(Denominator/Numerator)] (e.g., INT[X*(N/M)]), where the value "X*(N/M) is truncated to the lower integer value, and where X ranges from 1 to Numerator−1 (X=1 to M−1). Hence, the numerator 62 for the ratio "3:2" has the bit pattern "110", and the numerator 62 for the ratio "4:3" has the bit pattern "1110", etc.

Since the nominal clock frequency ratio (N:M) between the source clock and the target clock is known, during reset, the corresponding entry 60 is loaded into the pattern register 54; the pattern is either shifted by the initial numerator pointer value before loading, or the numerator pointer 52 is loaded with the initial value. Assertion of the data accept signal 38 causes the data supply logic 26 to load the data value into the buffer 22 during the corresponding LCLK clock cycle that the data accept signal 38 is asserted. Similarly, if the nominal clock frequency ratio (N:M) was 4:3, the pattern "1110" would be loaded into the pattern register 54, causing the data accept signal 38 to be asserted (and the data buffer 22 to be loaded) the first three out of every four LCLK cycles.

Hence, the pattern register 54 is configured for causing the data accept register 36 to output a data accept signal 36, for a corresponding writing of data by the data supply logic 26 into the data buffer, M times for every N clock cycles within the source clock domain (LCLK) 18a. As described below, the load circuit 30 also is configured for minimizing latency within the buffer 22.

During initialization of the circuit 10 (while Reset is asserted), the Data FIFO 22 is filled with the idle pattern, the numerator 52, load 34, and unload 32 pointers do not run, and the data accept signal 38 is deasserted. The deassertion of data accept prevents the Data Supply Logic 26 from sending any data when the synchronizer is unable to receive it, and prevents data from being lost.

As described above, the aligned edges 42 and 46 can be identified based on assertion of a periodic sync signal (PLL_Sync) generated by a counter 74 within the source clock domain 18a. In particular, the counter 74 is configured for counting out N cycles in the source clock domain 18a: the counter 74 is reset at the same time as the PLL dividers and counts every LCLK rising edge, wrapping to 0 after reaching N−1. The sync signal (PLL_Sync) is asserted every N cycles at event 70, generated off the rising edge 71 of the source clock (LCLK), and deasserts at event 72 off the falling edge of LCLK 42 that is nominally aligned with TxClk edge 46. Hence, the sync signal (PLL_Sync) signal identifies within the source clock domain 18a a clock cycle that ends with a nominally-aligned edge.

As described previously, latency is minimized by loading the data into the data buffer 22 just before the data is identified by the unload pointer 22. The minimum latency would be the time between the rising edge of the source clock (LCLK), and ensuring the latched data output onto the output data bus 20b is stable by the next rising edge of the target clock domain 18b, illustrated as being able to latch the data on the output bus 20b into an output register 76. This time is the sum of the time required for data propagate out of the flip-flops of the data FIFO 22 into which it was clocked, the time to propagate through the output mux 56, and the setup time to the output register 76.

The system 10 is initiated in response to deassertion of the negative-logic global chip reset signal 100. As illustrated in FIG. 2, the reset signal Reset# 100 needs to cross a clock boundary 80. Hence, the reset signal Reset# needs to be synchronized into the target clock domain 18b in order for the unload pointer counter 32 to begin operation in response to detection of an edge of the unload/reset# signal within the target clock domain 18b.

Normally, one would expect that any signal crossing across the clock boundary 80 (e.g., from clock domain 18a to clock domain 18b) would need to be synchronized into the new clock domain, for example using synchronizers having a cascaded chain of flip-flops. Also note that the load pointer counter 34 will not be running until the unload pointer counter 32 has been enabled. In the prior art the reset signal would have passed through the synchronizer, resulting in a first level of latency based on the synchronizer delay, the deassertion of the reset signal Reset# in the target clock domain 18b would cause the unload pointer counter 32 to begin operation by advancing on every clock edge (TxCLK) in the target clock domain 18b. At this point, however, the data buffer 22 only would be storing idle pattern data, hence the unload pointer counter 32 only would be outputting idle pattern data. In this example, however, the source clock domain 18a would need to know that the unload pointer counter 32 is operational and that the load pointer counter 34 can begin running for transfer of valid data into the buffer 22; hence, the deassertion of the reset signal Reset# in the target clock domain 18b normally would need to pass back to the source clock domain 18a via a second synchronizer, adding a second level of latency due to the delay in the second synchronizer. Hence, a conventional implementation would cause the second level of latency between the starting of the unload pointer counter 32 and starting the load pointer counter 34. This second level of latency adds to the latency in the data buffer 22 due to the delay between the unload pointer counter 32 and the load pointer counter 34.

According to the disclosed embodiment, uncertainty associated with passing a signal across a clock domain boundary 80 via a multi-stage synchronizer (e.g., from clock domain 18a to clock domain 18b) is greatly reduced based on the two clock domains 18a and 18b using respective clock signals LCLK and TxCLK having nominally-aligned edges 42 and 46 in response to a shared sync signal (PLL_Sync). As described above, the shared sync signal (PLL_Sync) is used by both PLLs 14a and 14b to align their respective rising clock edges 42 and 46 to the rising edge 40 of the reference clock. A multi-stage synchronizer has an uncertainty of at least the clock period at which it is sampling. The uncertainty in this method is merely the uncertainty between the nominally aligned edges 48.

Hence, the global chip reset signal (Reset#) 100 can be synchronized into the target clock domain 18b, without the necessity of a multi-stage synchronizer, by ensuring that change in the global chip reset signal from asserted to deasserted is delayed and supplied to the unload pointer counter 32 in the cycle immediately, before the occurrence of the nominally-aligned edges 42 and 46 at event 72.

According to the disclosed embodiment, the synchronizer 24 includes flip-flops 86 and 88. The flip-flop 86 is configured for outputting the edge 82 of the unload/reset# signal at event 78 in response to the following concurrent conditions: the global chip reset signal 100 being deasserted, the sync signal (PLL_Sync) signal being asserted by the sync counter 74 at event 70, and a falling edge 84 on the local clock signal (LCLK) at event 78. Hence, the edge 82 is output at event 78 using a single flip-flop.

The setup time 104 of the deassertion edge of reset from the flip-flop 86 to the unload pointer counter 32 can be bounded. Hence, the absence of any metastability in the unload pointer counter 32 can be guaranteed at the time that the PLL_Sync signal deasserts at event 72, which defines the first instance of the nominally-aligned edges following the transfer of the reset signal edge 82 into the target clock domain 18*b*, so long as the system delays are such that:

$$t_{CLK\text{-}OUT}+t_{RESET\text{-}PROP}+t_{SETUP}+t_U<\text{LCLK Period}/2,$$

where $t_{CLK\text{-}OUT}$ represents the delay in the flip-flop 86 between detecting the falling edge 84 of the LCLK signal and outputting the edge 82, $t_{RESET\text{-}PROP}$ represents the propagation delay in the falling edge 84 propagating between the output of the flip-flop 86 and the input of the unload pointer counter 32, and $t_{SETUP}$ represents the setup delay of the flip-flops internal to the unload pointer counter 32, and $t_U$ represents the uncertainty 48 between the nominally aligned edges.

Hence, the need for a multi-stage synchronizer from the source clock domain 18*a* into the target clock domain 18*b* is eliminated, so long as the setup is completed by the TxCLK edge 46 at event 72. As described above, the rising reset edge 82 will be supplied in the target clock domain 18*b* at event 82 while the PLL_Sync signal is asserted in between events 70 and 72, in response to the falling edge 84 of the source clock (LCLK).

In addition, the flip-flop 88 is configured for asserting the load/reset# signal 108 in the source clock domain 18*a* at event 72 in response to the next rising edge 42 of the local clock 42, namely at the nominally-aligned edges 42 and 46. Since the LCLK edge 42 on which the flip-flop 88 samples the deassertion of reset is nominally aligned with the TxCLK edge 46 on which the unload pointer counter 32 sampled the deassertion of reset and began running, the time of running of the unload pointer counter 32 is known at that time to within the uncertainty $t_U$. At that time, the load pointer counter 34 can start running, with a one LCLK delay due to flip-flop 88.

Hence, no synchronizer is needed to detect, within the local clock domain 18*a*, the occurrence of the reset edge 82 within the target clock domain 18*b*, since the disclosed circuitry already guarantees that the unload pointer counter 32 will be in a stable state by the nominally aligned edges 42 and 46 at event 72.

Since the unload pointer counter 32 is initialized before the nominally aligned edges 42 and 46 before event 72, the uncertainty in the number of pointer values that could be advanced by the unload pointer counter 32 prior to the event 72 can be precalculated: the precalculated delay is then translated into a pointer offset that is stored as the load pointer start value 63 of FIG. 4.

FIG. 5 is a diagram illustrating the method of precalculating the delay between the unload pointer counter 32 beginning before the load pointer counter 34, and generating a load pointer start value 63 and an initial numerator pointer 65 based on the precalculated delay. As the unload pointer starts running first, the optimal values cause the load pointer counter 34 to point the minimum distance beyond the maximum possible value of the unload pointer counter 32, and start loading in the last possible LCLK cycle before the earliest point an unload could safely occur. In order for an unload to be safe, the data entry in the data FIFO 22 must have been stable long enough for its output to propagate out, through the multiplexer 56, and setup to the output register 76. In particular, the calculation starts by determining the maximum length of time the unload pointer may have been running at the time that the load pointer starts running. This delay D is equal to one LCLK period (the delay from the output of flip-flop 88 to the advancement of the load pointer counter 34) plus the uncertainty between the nominally aligned edges, $t_U$ 48. The load pointer must get out ahead of unload pointer by enough time to allow the unload to be safe, so we add into D the following: $t_{CLK\text{-}OUT}$ for the data coming out of the data FIFO 22, $t_{PROP}$ for the time to propagate through the multiplexer 56 and across the bus 20*b*, and tsetup for the output register 76.

The delay D also may include a timing offset (TO) representing a "guard band" that may be implemented, for example, due to process variations, described below. The delay D of step 110 is converted in step 112 into a number of transmit clock cycles (P_TxCLK) representing the possible number of pointer values the unload pointer counter 32 may have advanced due to transmit clock cycles having occurred during the delay D, based on dividing the delay D by the minimum period (i.e., clock cycle interval) of the transmit clock (TxCLK) as adjusted for short-term jitter. Note that this calculated maximum unload pointer value may not be an integer. This is because the unload pointer value is being calculated on an LCLK edge, which may be in the middle of a TxCLK cycle. It is necessary to round the initial load pointer value up to the next whole value, which adds latency.

Referring again to FIG. 4, the numerator patterns in the lookahead table 50 are adjusted to be earlier than an even distribution to adjust for non-integer remainders between that may be present in the clock ratios, and any uncertainty or timing variations (e.g., "slack") in the circuitry. For example, the entry 60 for the ratio "8:3" ideally would cause data to be loaded into the buffer memory 22 at LCLK time instances of 0, 2⅔, and 5⅓ LCLK cycles in order to provide zero latency. Since sample points are always on LCLK edges, and therefore at integral numbers of LCLK cycles, the bits representing numerator loading values are rounded down to the next earlier bit pattern (i.e., 2⅔ shifted down to bit 2, 5⅓ shifted down to bit 5), sacrificing some latency in the buffer 22 while insuring no metastability effects are encountered on the output data bus 20*b*.

As mentioned above, it is possible that the calculation of the initial load pointer value had to be rounded up, at some cost in latency. It is possible to get some of that latency back, if the additional latency was greater than a full LCLK cycle. The algorithm given above for calculating the numerator patterns always results in bit 0 being a 1, and some number of the highest bits (depending on the frequency ratio) being 0. So, if the numerator pattern were rotated backwards by some number of bit positions into the 0 bits, that would delay the initial loading by that many LCLK cycles, while still commencing loading at the same pointer location in the data FIFO. All subsequent loads would be similarly delayed. The appropriate number of bits to shift is calculated by taking the amount by which the initial load pointer value was rounded up and multiplying it by the clock ratio N:M, to convert from TxCLK periods to LCLK periods, and rounding down to the nearest integer (step 114). This number is stored in the lookup table 50 as the initial numerator pointer value.

As described above, the initial numerator pointer 65 and the load pointer start value 63 may vary depending on "slack value", or a timing offset to accommodate initial setup variation. Most calculated values already contain some slack, due to the need to round up to a full LCLK period. So, for a given desired minimum slack, it may or may not be necessary to adjust the output of the lookup table. For example, if the timing offset is 1 nanosecond (ns) and the LCLK clock frequency is 250 MHz, the timing offset corresponds to one-fourth a 4 ns clock cycle; depending on the additional delay parameters, there may be no further need to change the initial numerator pointer 65 or the load pointer start value 63 illustrated in FIG. 4. If the timing offset is 2 ns (equal to ½ a 4 ns LCLK cycle), it may be determined that a sufficient guard band exists to maintain the existing load pointer start value 63 and the corresponding initial numerator pointer 65. However, if the timing offset is 7 ns, then the load pointer start value 63 and the corresponding initial numerator pointer 65 may need to be adjusted for certain ratios (N:M) to delay transfer of the data but start at a higher pointer index. Hence, a plurality of lookahead tables 50 may be implemented, each having a corresponding set of bit patterns 62 and load pointer start values 63 for respective timing offset values.

According to the disclosed embodiment, a low-latency method is providing for transitioning between clock domains using respective clocks derived from a common source. The minimum latency through the buffer 22 for the initial data word can be calculated precisely based on the frequency ratio and the maximum static error in the nominally-aligned edges. All subsequent data words have this same latency or higher, due to the rounding down performed during calculation of the numerator pattern and the uncertainty due to clock jitter. In addition, programmability of latency margin can be provided to compensate for process variations or uncertainty due to jitter calculations by adding an offset (TO) into the calculated latency for the first data word: multiple sets of table entries can be calculated for different margin/offset values, and selected during runtime, providing programmable margins.

While this invention has been described with what is presently considered to be the most practical preferred embodiment, it is to be understood that the invention is not limited to the disclosed embodiments, but, on the contrary, is intended to cover various modifications and equivalent arrangements included within the spirit and scope of the appended claims.

What is claimed is:

1. A synchronous transmission system comprising:
a source clock source configured for generating a source clock signal at a corresponding first multiple of a reference clock signal, the source clock signal having a first nominally-aligned edge relative to an edge of the reference clock signal;
a target clock source configured for generating a target clock signal at a corresponding second multiple of the reference clock signal, the target clock signal having a second nominally-aligned edge relative to the edge of the reference clock signal, the first and second multiples being unequal and providing a clock ratio between the source and target clock signals;
first circuitry configured for outputting data according to a first bandwidth in response to a data accept signal synchronous with the source clock signal, the first circuitry including a sync counter configured for generating a periodic sync signal indicating the first and second nominally-aligned edges are aligned relative to each other;
a data buffer configured for storing the output data, synchronous with the source clock signal, at a first location specified by a load pointer and outputting stored data from a second location specified by an unload pointer;
an unload pointer counter configured for outputting the unload pointer synchronous with the target clock signal for output of the stored data according to a second bandwidth lower than the first bandwidth, the unload pointer counter enabled in response to deassertion of a first reset signal and configured for incrementing the unload pointer in response to a prescribed edge of the target clock signal that has a same polarity as the first and second nominally-aligned edges;
a load circuit configured for outputting the data accept signal at selected instances corresponding to the second multiple relative to the first multiple of the source clock cycles, the load circuit including a load pointer counter configured for outputting the load pointer from a selected initial value and synchronous with the source clock signal, the load pointer counter enabled in response to deassertion of a second reset signal and configured for selectively incrementing the load pointer in response to the corresponding prescribed edge of the source clock signal; and
a reset synchronizer circuit including:
(1) a first flip-flop configured for outputting the deassertion of the first reset signal, coincident with an inverse-polarity edge of the source clock signal immediately preceding the first and second nominally-aligned edges, in response to a global reset signal deasserted concurrent with assertion of the periodic sync signal during the inverse-polarity edge of the source clock signal that immediately precedes the first nominally-aligned edge, a time interval between the inverse-polarity edge and the first nominally-aligned edge corresponding to one half of a clock cycle of the source clock signal and providing an adequate setup time between the unload pointer counter detecting the deassertion of the first reset signal and a stable state for the unload pointer counter; and
(2) a second flip-flop configured for outputting the deassertion of the second reset signal, coincident with the first and second nominally-aligned edges, in response to the global reset signal deasserted concurrent with assertion of the periodic sync signal during the first nominally-aligned edge of the source clock signal.

2. The system of claim 1, wherein the load circuit further includes a table configured for storing a first plurality of entries for a prescribed timing offset, each entry specifying a prescribed bit pattern for a corresponding clock ratio, the bit pattern specifying the selected instances for outputting the data accept signal according to the second multiple relative to the first multiple of the source clock cycles, and the corresponding incrementing of the load pointer, each prescribed bit pattern selected based on an integer-based normalization of the clock ratio relative to a determined delay between initiating the unload pointer counter and initiating the load pointer counter.

3. The system of 2, wherein each entry further specifies a corresponding prescribed load pointer start value to be loaded into the load pointer counter as said selected initial value in response to the deassertion of the second reset signal, the corresponding prescribed load pointer start value calculated based on the determined delay and the integer-based normalization of the clock ratio.

4. The system of 3, wherein the table further includes a second plurality of said entries for a corresponding second prescribed timing offset, the prescribed timing offset and the second prescribed timing offset each specifying a corresponding timing margin, the table configured for being accessible for one of the entries based on a selected clock ratio for a corresponding one of the timing margins.

5. The system of claim 1, further comprising an output register configured for latching the stored data output from the data buffer in response to prescribed edge of the target clock signal.

6. A method in a synchronous transmission system, the method comprising:

first providing a source clock source configured for generating a source clock signal at a corresponding first multiple of a reference clock signal, the source clock signal having a first nominally-aligned edge relative to an edge of the reference clock signal;

second providing a target clock source configured for generating a target clock signal at a corresponding second multiple of the reference clock signal, the target clock signal having a second nominally-aligned edge relative to the edge of the reference clock signal, the first and second multiples being unequal and providing a clock ratio between the source and target clock signals;

outputting data from first circuitry according to a first bandwidth in response to a data accept signal synchronous with the source clock signal, the first circuitry including a sync counter configured for generating a periodic sync signal indicating the first and second nominally-aligned edges are aligned relative to each other;

storing the output data, synchronous with the source clock signal, in a data buffer at a first location specified by a load pointer;

outputting stored data from a second location in the data buffer specified by an unload pointer;

outputting from an unload pointer counter the unload pointer synchronous with the target clock signal for output of the stored data according to a second bandwidth lower than the first bandwidth, the unload pointer counter enabled in response to deassertion of a first reset signal and configured for incrementing the unload pointer in response to a prescribed edge of the target clock signal that has a same polarity as the first and second nominally-aligned edges;

outputting by a load circuit the data accept signal at selected instances corresponding to the second multiple relative to the first multiple of the source clock cycles;

outputting, by a load pointer counter in the load circuit, the load pointer from a selected initial value and synchronous with the source clock signal, the load pointer counter enabled in response to deassertion of a second reset signal and configured for selectively incrementing the load pointer in response to the corresponding prescribed edge of the source clock signal;

outputting, from a first flip-flop within a reset sychronizer circuit, the deassertion of the first reset signal, coincident with an inverse-polarity edge of the source clock signal immediately preceding the first and second nominally-aligned edges, in response to a global reset signal deasserted concurrent with assertion of the periodic sync signal during the inverse-polarity edge of the source clock signal that immediately precedes the first nominally-aligned edge, a time interval between the inverse-polarity edge and the first nominally-aligned edge corresponding to one half of a clock cycle of the source clock signal and providing an adequate setup time between the unload pointer counter detecting the deassertion of the first reset signal and a stable state for the unload pointer counter; and outputting, from a second flip-flop in the reset sychronizer circuit, the deassertion of the second reset signal, coincident with the first and second nominally-aligned edges, in response to the global reset signal deasserted concurrent with assertion of the periodic sync signal during the first nominally-aligned edge of the source clock signal.

7. The method of claim 6, wherein the load circuit further includes a table configured for storing a first plurality of entries for a prescribed timing offset, each entry specifying a prescribed bit pattern for a corresponding clock ratio, the bit pattern specifying the selected instances for outputting the data accept signal according to the second multiple relative to the first multiple of the source clock cycles, and the corresponding incrementing of the load pointer, each prescribed bit pattern selected based on an integer-based normalization of the clock ratio relative to a determined delay between initiating the unload pointer counter and initiating the load pointer counter.

8. The method of claim 7, wherein each entry further specifies a corresponding prescribed load pointer start value to be loaded into the load pointer counter as said selected initial value in response to the deassertion of the second reset signal, the corresponding prescribed load pointer start value calculated based on the determined delay and the integer-based normalization of the clock ratio.

9. The method of claim 8, wherein the table further includes a second plurality of said entries for a corresponding second prescribed timing offset, the prescribed timing offset and the second prescribed timing offset each specifying a corresponding timing margin, the table configured for being accessible for one of the entries based on a selected clock ratio for a corresponding one of the timing margins.

10. The method of claim 6, further comprising latching the stored data output from the data buffer by an output register in response to prescribed edge of the target clock signal.

* * * * *